(12) United States Patent
Stoller

(10) Patent No.: US 10,261,214 B2
(45) Date of Patent: Apr. 16, 2019

(54) METHOD AND APPARATUS FOR SEPARATING GAMMA AND NEUTRON SIGNALS FROM A RADIATION DETECTOR AND FOR GAIN-STABILIZING THE DETECTOR

(71) Applicant: Schlumberger Technology Corporation, Sugar Land, TX (US)

(72) Inventor: Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 71 days.

(21) Appl. No.: 15/143,657

(22) Filed: May 2, 2016

(65) Prior Publication Data

US 2017/0315260 A1    Nov. 2, 2017

(51) Int. Cl.
*G01V 5/10* (2006.01)
*G01V 3/08* (2006.01)
*G01V 3/38* (2006.01)

(52) U.S. Cl.
CPC ............... *G01V 5/104* (2013.01); *G01V 3/38* (2013.01); *G01V 2003/086* (2013.01);
(Continued)

(58) Field of Classification Search
CPC ........ G01V 5/104; G01V 5/101; G01V 5/107; G01V 5/102; G01V 5/10; G01V 5/12;
(Continued)

(56) References Cited

U.S. PATENT DOCUMENTS 3,922,541 A   11/1975 Seeman
4,152,590 A * 5/1979 Smith, Jr. .............. G01V 5/105
                                        250/264

(Continued)

FOREIGN PATENT DOCUMENTS

WO    2016053250 A1    4/2016

OTHER PUBLICATIONS

Smith et al., "Fast Neutron Spectroscopy Using Cs2LiYCl6:Ce (CLYC) Scintillator", IEEE, Apr. 2013, IEEE Transactions on Nuclear Science, vol. 60, Issue 2, pp. 855-859.
(Continued)

*Primary Examiner* — Taeho Jo
(74) *Attorney, Agent, or Firm* — Michael Dae

(57) ABSTRACT

A method for separating and quantifying gamma ray induced and neutron induced responses in a radiation detector includes detecting radiation in a radiation field comprising neutrons and gamma rays. The detected events are converted into a detector pulse amplitude spectrum. The pulse amplitude spectrum is decomposed into contributions from detected gamma rays and detected neutrons using gamma ray standard spectra and neutron standard spectra and a spectral fitting procedure which results in a best fit between a weighted sum of the contributions and the detector pulse amplitude spectrum. The fitting procedure includes determining fitting parameters for each of the standard spectra wherein at least one of the fitting parameters is different for the gamma ray standard spectra and the neutron standard spectra. In one embodiment, the fitting parameter is spectral gain.

20 Claims, 6 Drawing Sheets

(52) U.S. Cl.
CPC .... *G01V 2210/661* (2013.01); *G01V 2210/70* (2013.01); *G01V 2210/72* (2013.01)

(58) Field of Classification Search
CPC ........ G01V 5/145; G01V 5/105; G01V 99/00; G01V 5/04; G01V 5/06; G01V 5/108; G01V 5/125; G01V 11/00; G01V 3/38; G01V 5/02; G01V 2003/086; G01V 2210/661; G01V 2210/70; G01V 2210/72
USPC ....................................................... 250/261
See application file for complete search history.

(56) References Cited

U.S. PATENT DOCUMENTS

| | | | | |
|---|---|---|---|---|
| 4,317,993 A * | 3/1982 | Hertzog, Jr. | ........... | G01V 5/105 250/269.8 |
| 4,394,574 A * | 7/1983 | Grau | ............ | G01V 5/102 250/262 |
| 4,587,424 A * | 5/1986 | Grau | ............ | G01V 5/101 250/262 |
| 5,081,351 A * | 1/1992 | Roscoe | ............ | G01V 5/125 250/265 |
| 5,171,986 A * | 12/1992 | Loomis | ............ | G01T 1/202 250/252.1 |
| 5,360,975 A * | 11/1994 | Stoller | ............ | G01V 5/04 250/261 |
| 5,369,578 A * | 11/1994 | Roscoe | ............ | G01V 5/06 702/8 |
| 5,434,408 A * | 7/1995 | Smith, Jr. | ............ | G01V 5/101 250/269.6 |
| 6,207,953 B1 * | 3/2001 | Wilson | ............ | G01V 5/104 250/269.4 |
| 7,081,616 B2 | 7/2006 | Grau et al. | | |
| 8,173,953 B2 | 5/2012 | Stoller et al. | | |
| 2002/0130258 A1 * | 9/2002 | Odom | ............ | G01T 3/06 250/269.6 |
| 2002/0130268 A1 * | 9/2002 | Odom | ............ | G01T 3/06 250/390.11 |
| 2002/0175291 A1 * | 11/2002 | Reeder | ............ | G01T 3/06 250/369 |
| 2003/0006768 A1 * | 1/2003 | Kleinberg | ............ | G01N 24/081 324/303 |
| 2007/0145259 A1 * | 6/2007 | Gilchrist | ............ | G01V 5/101 250/269.1 |
| 2009/0048795 A1 * | 2/2009 | Scoullar | ............ | G01T 1/202 702/66 |
| 2014/0097335 A1 * | 4/2014 | Inanc | ............ | G01V 5/107 250/265 |
| 2014/0217273 A1 * | 8/2014 | Grau | ............ | G01V 5/04 250/252.1 |
| 2014/0231640 A1 * | 8/2014 | Grau | ............ | G01V 5/101 250/269.6 |
| 2014/0246595 A1 * | 9/2014 | Menge | ............ | G01T 3/06 250/369 |
| 2015/0331141 A1 | 11/2015 | Grau et al. | | |
| 2015/0331144 A1 | 11/2015 | Grau et al. | | |
| 2016/0245948 A1 * | 8/2016 | Beekman | ............ | G01V 5/104 |
| 2016/0349398 A1 * | 12/2016 | Zhou | ............ | G01V 5/10 |
| 2017/0045639 A1 * | 2/2017 | Zhou | ............ | G01V 5/101 |
| 2017/0115428 A1 * | 4/2017 | Zhou | ............ | G01V 5/045 |
| 2017/0153354 A1 * | 6/2017 | Grau | ............ | G01V 5/101 |

OTHER PUBLICATIONS

Glodo et al., "Fast Neutron Detection with Cs2LiYCL6", IEEE, Apr. 2013, IEEE Transactions on Nuclear Science, vol. 60, Issue 2, pp. 864-870.

P. Menge, D. Richaud, "Behavior of Cs2LiYCl6:Ce Scintillator up to 175°C", 2011 IEEE Nuclear Science Symposium Conference Record. Paper NP5.S-64.

\* cited by examiner

METHOD AND APPARATUS FOR SEPARATING GAMMA AND NEUTRON SIGNALS FROM A RADIATION DETECTOR AND FOR GAIN-STABILIZING THE DETECTOR

CROSS-REFERENCE TO RELATED APPLICATIONS

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND

This disclosure is related to the field of neutron well logging measurements for determining petrophysical properties of subsurface formations traversed by a wellbore. More specifically, the disclosure relates to methods and apparatus for determining whether signals generated by a radiation detector in a well logging instrument were induced by neutrons or gamma rays. The disclosure also relates to methods and apparatus for gain stabilization of radiation detectors.

Well logging instruments known in the art include various types of radiation detectors that are capable of detecting neutrons and gamma rays. Radiation detectors include gas-filled tubes in which the gas becomes ionized following a radiation event in the tube that the detector is configured to detect. Other types of radiation detectors include scintillation detectors, which may comprise a radiation sensitive scintillation crystal optically coupled to a photomultiplier tube. Scintillation detectors may be used, for example and without limitation, detecting gamma rays so as to be able to characterize the energy of the detected gamma rays by measuring the amplitude of each signal pulse generated by the photomultiplier tube.

There remains a need for a radiation detector, or a method or system utilizing a radiation detector, that delivers improved well logging performance.

SUMMARY

A method for separating and quantifying gamma ray induced and neutron induced responses in a radiation detector according to one aspect of this disclosure includes detecting radiation in a radiation field comprising neutrons and gamma rays. The detected radiation events are converted into a detector pulse amplitude spectrum. The pulse amplitude spectrum is decomposed into contributions from detected gamma rays and detected neutrons using gamma ray standard spectra and neutron standard spectra and a spectral fitting procedure which results in a best fit between a weighted sum of the contributions and the detector pulse amplitude spectrum. The fitting procedure includes determining fitting parameters for each of the standard spectra where at least one of the fitting parameters is different for the gamma ray standard spectra and the neutron standard spectra. In one embodiment, the fitting parameter is spectral gain.

A method for stabilizing the gain of a spectroscopy system for gamma rays and neutrons is also disclosed. The method comprises detecting radiation events in a radiation field comprising neutrons and gamma rays. In a processor, the detected radiation events are converted into a pulse amplitude spectrum. In the processor, the detector pulse amplitude spectrum is decomposed into contributions from detected gamma rays and detected neutrons using gamma ray standard spectra and neutron standard spectra and a spectral fitting procedure which results in a best fit between a weighted sum of the contributions and the detector pulse amplitude spectrum. The fitting procedure comprises determining, in the processor, fitting parameters for each of the gamma ray standard spectra and neutron standard spectra, at least one of the fitting parameters is a spectral gain. In the processor, the spectral gain fitting parameter is used to adjust a gain of a radiation detector spectroscopy system.

A system is also disclosed for detecting neutrons and gamma rays using single detector and distinguishing the neutron contribution from the gamma ray contribution in a pulse height spectrum. The system comprises a neutron and gamma ray detector where the neutrons are detected through a neutron reaction inducing heavy charged particles, a detector pulse amplitude analyzer in signal communication with the neutron and gamma ray detector, and a processor in signal communication with the detector pulse amplitude analyzer configured decompose an output thereof into spectral contributions from gamma rays and neutrons using a fitting procedure establishing a best fit between a set of standard spectra and the output of the detector pulse amplitude analyzer. The processor is configured to calculate at least one fitting coefficient for the fitting procedure where the at least one of the fitting coefficients applied to the decomposed output is different between the neutron and the gamma ray standard spectra. The processor is further configured to determine elemental gamma ray contributions and neutron contributions from the decomposed output and the determined fitting coefficients.

Other aspects and advantages will be apparent from the description and claims that follow.

DETAILED DESCRIPTION

Figure 1A:
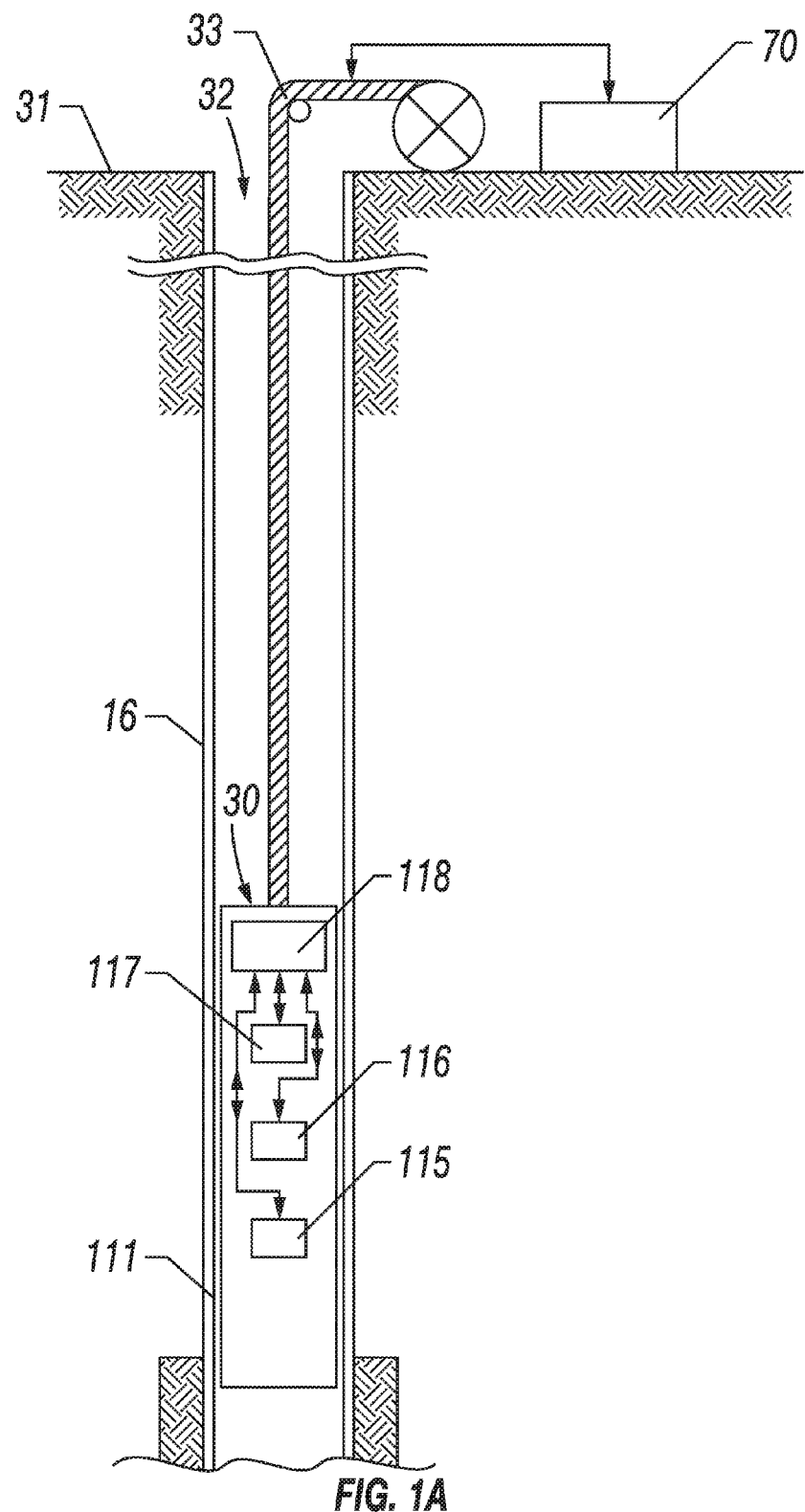
FIG. 1A shows an example well logging instrument conveyed through a wellbore by an electrical cable ("wireline").

Neutron detection using scintillation detectors containing thermal and epithermal neutron absorbers in the scintillation crystal has been used for some time, but is generally believed to be inferior to neutron detection using neutron-specific detectors such as helium-3 ($^3$He) detectors (i.e., in the form of a gas-filled tube as explained above). In particular, the commonly used lithium-6 ($^6$Li) glass scintillation detectors have been shown to provide mediocre and incomplete separation of detected gamma rays and neutrons from the entire spectrum of detected radiation events, because neutron/gamma ray identification is performed based only on photomultiplier pulse-height discrimination. In such discrimination it is assumed that the high energy part of the spectrum (>≈3 MeV) is dominated by detected neutrons. For well logging, the usefulness of Li-glass scintillation detectors is limited as the detection performance deteriorates rapidly above 130° C., and such temperatures are commonly encountered by well logging instruments in the ordinary course of their use.

Gain regulation of scintillation detector spectroscopy systems and spectral decomposition are used in a multitude of applications and have been described in, for example and without limitation, U.S. Pat. Nos. 3,922,541, 4,394,574, 5,360,975, 5,369,578, 7,081,616 and 8,173,953. However, none of the foregoing patents appears to describe a reliable gain stabilizing technique or spectral analysis technique for radiation detectors that are used for the simultaneous detection of neutrons and gamma rays or of detectors in which neutron interactions may cause interference with the identification and analysis of the detected gamma ray spectrum.

Recently there has been renewed interest in finding alternatives to the $^3$He neutron detector with detectors that do not use scarce and expensive $^3$He gas. Examples of alternatives are boron coated gas-proportional counters, $BF_3$-counters and neutron sensitive scintillation detectors. Research and development of boron coated detectors has been ongoing for an extended time to pursue these technologies and make them suitable for downhole applications.

More recently, a significant research effort has been ongoing into the development of high performance scintillators containing lithium (typically $^6$Li enriched). One group of scintillation detectors are the so-called Elpasolites such as "CLYC" ($Cs_2LiYCl_6$:Ce) and "CLLB" ($Cs_2LiLaBr_6$:Ce) for example. CLYC and CLLB scintillation detectors have significant sensitivity to slow neutrons, e.g., thermal and epithermal neutrons, but in the case of CLYC there is also sensitivity to fast neutrons through fast neutron reactions such as $^{35}Cl(n,p)\rightarrow ^{35}S$. See, for example, "Fast Neutron Spectroscopy Using $Cs_2LiYCl_6$:Ce (CLYC) Scintillator", Smith M. B., Achtzehn T., Andrews H. R., Clifford E. T., Ing H., Kovaltchouk V. D. 2, s.l.: IEEE, April 2013, IEEE Transactions on Nuclear Science, Vol. 60, pp. 855-859. See also, "Fast Neutron Detection with $Cs_2LiYCl_6$", Glodo J., Shirwadkar U., Hawrami R., Achtzehn T., Andrews H. R., Clifford T. H., Ing H., Kovaltchouk V. D., Smith M. B. and Shah K. S. 2, s.l.: IEEE, April 2013, IEEE Transactions on Nuclear Science, Vol. 60, pp. 864-870 in addition to the capture reaction $^6Li(n,\alpha)\rightarrow ^3H$. The latter reaction is the one used for thermal and epithermal neutron detection, but it is also related to neutron detection at higher neutron energies.

The neutron reaction in a scintillator leads to heavy (compared to electrons) energetic charged particles and a correspondingly high ionization density. This effect, and the non-linear relationship between light emission and the kinetic energy deposited by a heavy particle (proton, alpha, triton) in the scintillation material causes the apparent total energy in the photomultiplier pulse height spectrum to be lower than for the same amount of energy deposited by an electron (typically as a consequence of a gamma ray interaction, which may result in the energy transfer to one or more electrons) and poor energy resolution. For certain scintillators such as CLYC, the pulse shape at the output of a photomultiplier or similar device is different for electrons and for heavy particle deposited energies. The electron (gamma ray) induced signal shows a fast component (fast rise and fall time) not present when a heavy charged particle is detected by the scintillator. This characteristic of the photomultiplier signal output can be used to distinguish (discriminate) between neutron and gamma ray interactions in the scintillator through pulse shape discrimination (PSD).

Experiments have shown that for CLYC, PSD works well at room temperature (about 25° C.) but may not work at temperatures above about 130° C. for ordinary CLYC scintillators. See, P. Menge, D. Richaud, "Behavior of Cs2LiYCl6:Ce Scintillator up to 175° C.", 2011 IEEE Nuclear Science Symposium Conference Record. Paper NP5.S-64. As explained above, discrimination between neutrons and gamma rays detected by certain scintillation detectors such as $^6$Li-glass is performed based on photomultiplier pulse height only. In a $^6$Li-based scintillator a typical photomultiplier pulse height resulting from the $^6$Li-reaction will be between 3 and 4 MeV gamma ray equivalent compared to a true energy deposit of 4.8 MeV. On the other hand, the neutron induced gamma ray spectrum, although predominantly occurring at lower energies, can reach 8 MeV and higher. Therefore pulse height based discrimination will have some contamination of the neutron counts by high energy gamma ray counts.

It should also be noted that the energy-to-pulse height conversion factor may change from one scintillator to another (even if made of the same material) and may also depend on temperature. In the absence of pulse shape discrimination in particular, this poses a significant challenge for spectral analysis and spectral gain regulation.

One aspect of the current disclosure relates to a method which allows distinguishing between neutron induced and gamma ray induced contributions to pulse amplitude spectra. The method should be functional in the absence of PSD and may complement PSD in cases in which PSD may not provide sufficient discrimination. The current disclosure further provides a method of gain regulation for the pulse height spectra while avoiding the use of radioisotope sources for this purpose.

Figure 1B:
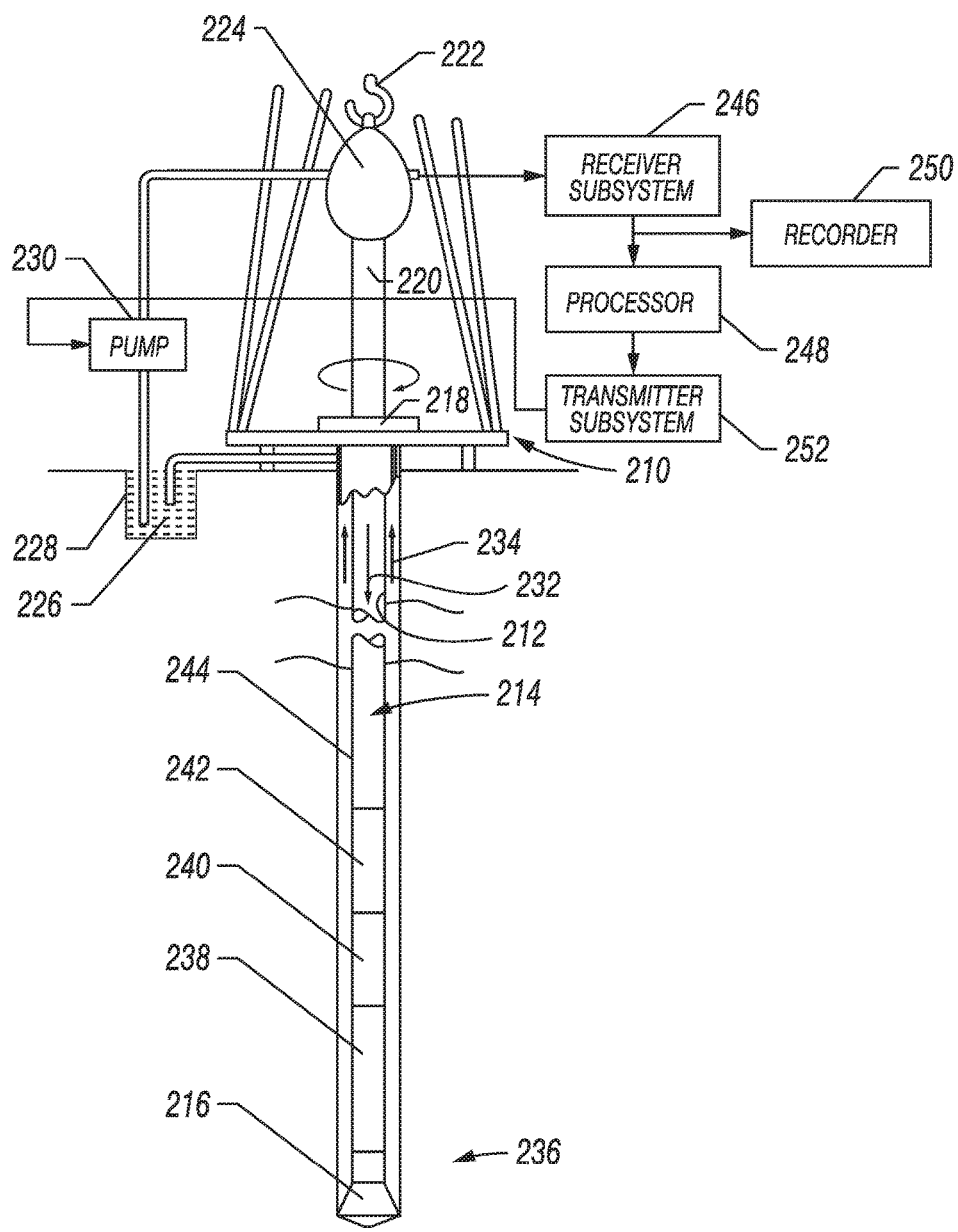
FIG. 1B shows an example logging while drilling instrument on a drill string.
Figure 1C:
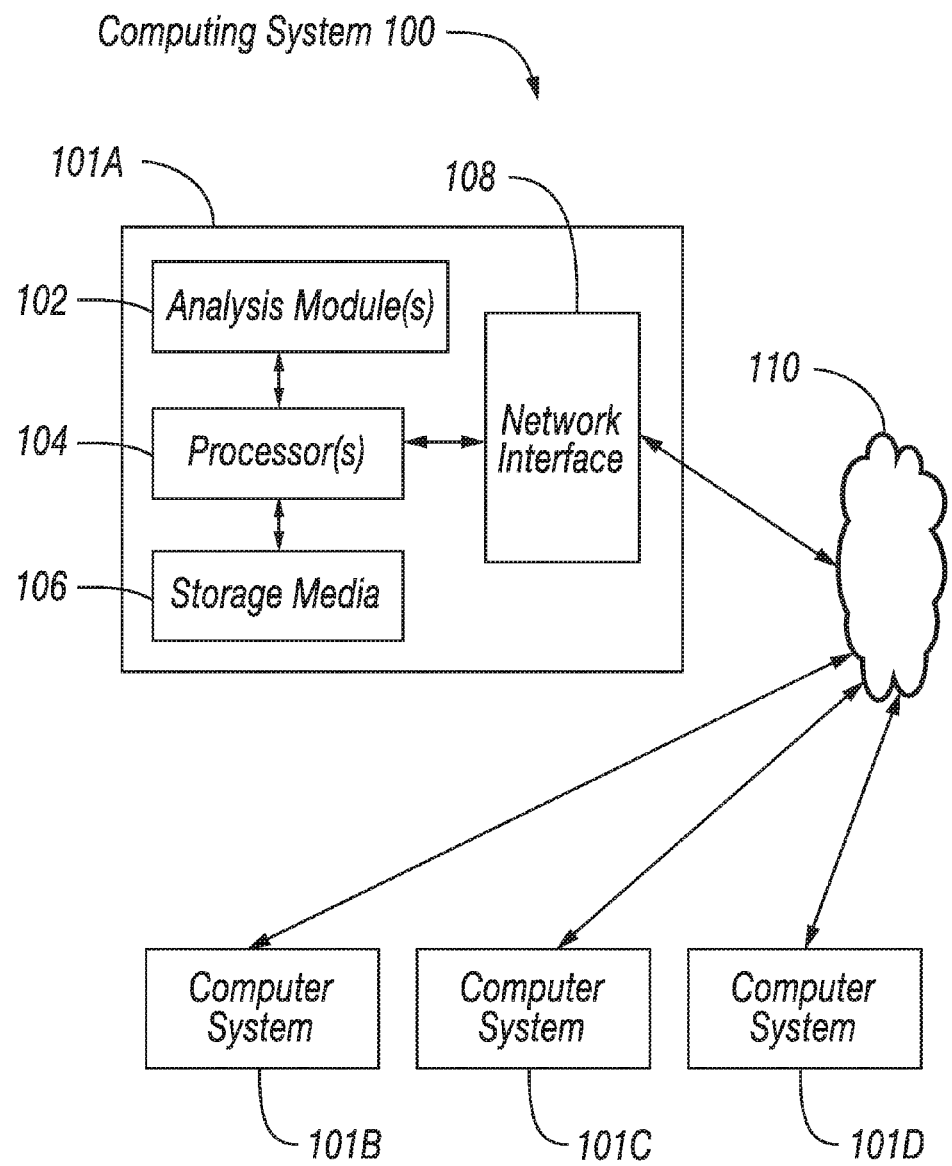
FIG. 1C shows an example computer system that may be used in some implementations.

The description which follows with reference to FIGS. 1A, 1B and 1C is intended to show various well logging instruments, devices and systems for conveying well logging instruments along the interior of a subsurface wellbore and systems for processing signals from well logging instruments. The example devices shown in FIGS. 1A, 1B and 1C are not intended to limit the scope of the present disclosure to any specific configuration of well logging instrument or to any manner of conveyance of a well logging instrument through a wellbore. An example well logging instrument having components according to the present disclosure will be explained further with reference to FIG. 1D.

FIG. 1A shows an example well logging instrument 30. The measurement components of the instrument 30 may be disposed in a housing 111 shaped and sealed to be moved along the interior of a wellbore 32. The instrument housing 111 may contain at least one energy source 115, e.g., a neutron source such as electrically operated pulsed or continuous output neutron source or a chemical isotope neutron source (hereinafter "source"), and one or more radiation detectors 116, 117 each disposed at different axial spacings from the source 115. Shielding (FIG. 1D) may be disposed in the housing 111 between the source 115 and the radiation detectors 116, 117 to reduce direct transmission of neutrons from the source 115 to the radiation detectors 116, 117. Thus, detected radiation may be characterized at each of a plurality of distances from the source 115, and thus have different lateral response (depth of investigation) into the formations surrounding the wellbore 32. In some example embodiments, two or more different types of well logging instruments, each having a different type of source and different types of corresponding detectors may be included in the same instrument assembly of the "tool string."

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the radiation detectors 116, 117 may be processed by suitable circuitry 118 for transmission along the cable 33 to the recording system 70. The recording system 70 may include a processor, computer or computer system as will be explained below with reference to FIG. 1C for analysis of the detected signals as well as devices for recording the signals communicated along the cable 33 from the instrument 30 with respect to depth and/or time.

The well logging instrument described above may also be configured to be used, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a Kelly 220 at the upper end of the drill string 214. The drill string 214 is typically suspended from a hook 222 attached to a traveling block (not shown). The Kelly 220 may be connected to the hook 222 through a rotary swivel 224 which permits rotation of the drill string 214 relative to the hook 222. In some embodiments, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, sometimes near the drill bit 216. The BHA 236 may include subassemblies for making measurements, processing and storing information and for communicating with the Earth's surface. Such measurements may correspond to those made using the instrument string explained above with reference to FIG. 1A. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions as well as on the demands of the measurement.

In the arrangement shown in FIG. 1B, the components of the well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 may also include conventional acquisition and processing electronics (not shown) comprising a microprocessor system (with associated memory, clock and timing circuitry, and interface circuitry) capable of timing the operation of the source and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing computations may be performed on a computer system such as one shown in the processor at 248 in FIG. 1B, or in the surface unit 70 in FIG. 1A. However, any computer or computers may be used to equal effect.

FIG. 1C shows an example computing system 100 in accordance with some embodiments for carrying out example methods such as those to be explained below with reference to FIGS. 4 and 5. The computing system 100 can be an individual computer system 101A or an arrangement of distributed computer systems. The computer system 101A includes one or more analysis modules 102 that are configured to perform various tasks according to some embodiments, such as the tasks described above. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents). Any one or more of the computer systems may be disposed in the well logging instrument (whether wireline as in FIG. 1A or LWD as in FIG. 1B).

A processor can include a microprocessor, microcontroller, processor module or subsystem, programmable integrated circuit, programmable gate array, digital signal processor (DSP), or another control or computing device.

The storage media 106 can be implemented as one or more non-transitory computer-readable or machine-readable storage media. Note that while in the embodiment of FIG. 1C storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or in some embodiments, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 1C, and/or computing system 100 may have a different configuration or arrangement of the components depicted in FIG. 1C. The various components shown in FIG. 1C may be implemented in hardware, software, or a combination of both hardware and software, including one or more signal processing and/or application specific integrated circuits.

Further, the acts in example methods described herein may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the current disclosure.

Figure 1D:
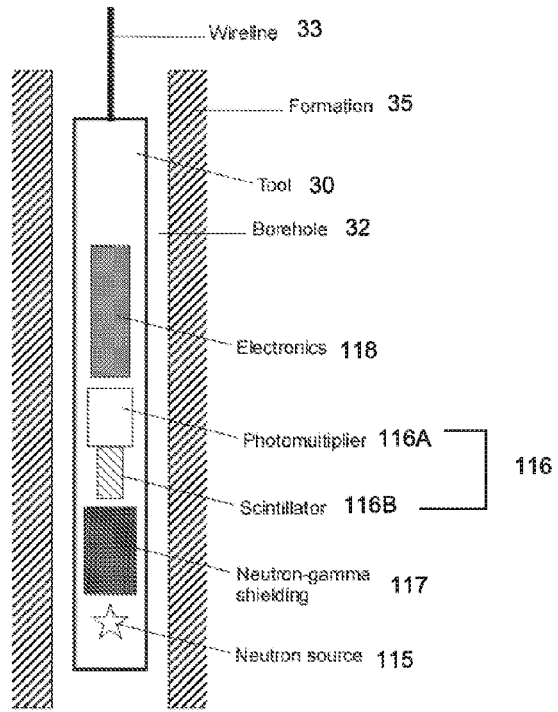
FIG. 1D shows a schematic representation of a generalized scintillation detector well logging instrument.

An example well logging instrument that may be used in accordance with the present disclosure is shown in FIG. 1D. The well logging instrument 30 may be conveyed through a wellbore 32 using an armored electrical cable 33 (as in FIG. 1A, or by a drill string as in FIG. 1B). The instrument 30 may include a neutron source 115 as explained above, which may be an electrically operated pulsed or continuous neutron generator or a chemical isotope source, including, without limitation, sources based on $^{252}$Cf and $^{241}$AmBe. Shielding 117 may be disposed in the instrument 30 between the source 115 and at least one radiation detector 116. In the present example embodiment, the radiation detector may be a scintillation detector having a scintillator 116B optically coupled to a photomultiplier 116A. The scintillator may comprise Elpasolite materials as explained herein including $^6$Li and/or scintillators using $^{10}$B as one of the elemental constituents. Electronics 118 in the instrument may comprise a controllable voltage power supply to operate the photomultiplier 116A and a multichannel analyzer of any type well known in the art electrically connected to the photomultiplier output to determine amplitude of each radiation event detection pulse emitted by the photomultiplier 116A and allocate each such amplitude-determined detection pulse to a respective counter such that numbers of detected radiation events with respect to apparent energy may be determined (collectively called the "spectrum").

Having explained in general terms a well logging instrument that may be used in accordance with the present disclosure, methods and apparatus will now be described in more detail.

Figure 2:
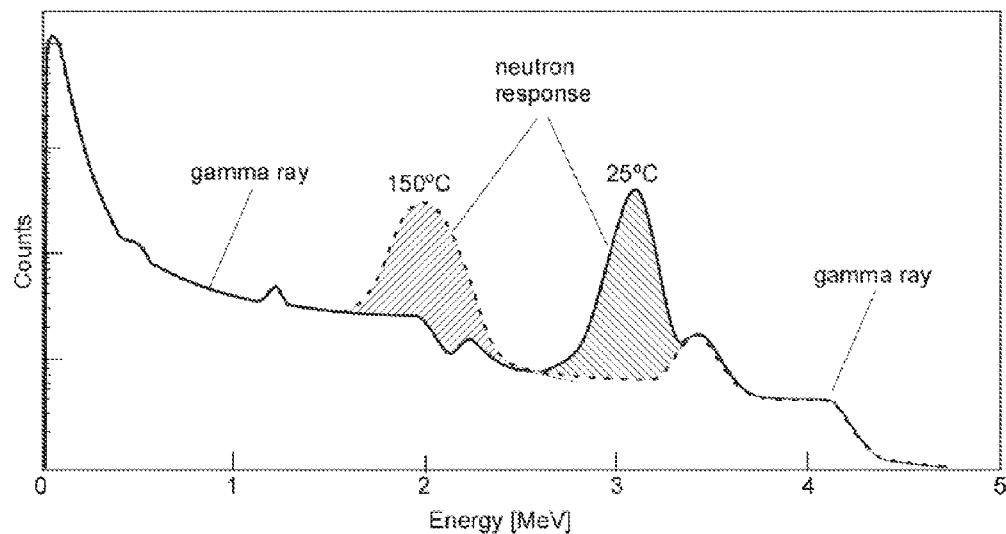
FIG. 2 shows a graph of combined neutron and gamma ray detector response at two different temperatures.

FIG. 2 shows schematically a spectrum acquired with a CLYC (as explained herein) scintillator in the presence of thermal neutrons at a detector temperature of 25° C. (solid line) and at 150° C. (dashed line). The spectra were adjusted to correct for temperature related gain change so that the gamma ray spectra would overlay at the two temperatures. A large shift and deterioration of the peak resolution may be observed for the neutron response. The peak moves from an electron equivalent (gamma ray) energy of about 3.2 MeV to an energy of about 2 MeV. If, for example, prior energy threshold discrimination methods were used, wherein a threshold of 2.5 MeV is used to discriminate between neutron and gamma ray response, the calculated neutron and gamma ray responses would be incorrect at 150° C. even if correct at 25° C.

Spectral decomposition of natural gamma ray spectra, gamma ray spectra from radioactive materials and neutron induced gamma ray spectra based on the use of spectral standards and linear or non-linear fitting has long been used as documented for example in the U.S. patents cited above. Spectral decomposition uses elemental standard spectra and a fitting algorithm that provides a best match of a weighted sum of the standard spectra to measured spectra. A standard spectrum is a spectrum that represents the energy distribution of gamma rays emitted from a single element (or a single elemental source such as capture gamma rays as described above) that is detected by a spectral gamma ray detector, typically but not exclusively, a scintillation detector. The shape of the standard spectrum may be affected by the density and atomic number of the material from which it originates, and, e.g., by intervening materials such as borehole casing or borehole fluid. A known fitting procedure estimates a best fit for the measured spectrum, where the measured spectrum is a linear combination of standard spectra. The procedure may be implemented as an algorithm as shown in equation (1):

$$U_i = \sum_{j=lower}^{upper} y_j \cdot S_{ij} \tag{1}$$

where U represents the measured spectrum within each of a number of pulse amplitude analyzer channels i, lower and upper represent the lower and upper channel numbers of the pulse amplitude analyzer (i.e., equivalent energy limits) in the spectrum used in the fit, yj is the yield (contribution) of the elemental standard j and S represents the standard spectrum of each element j within each channel numbers i.

Figure 3:
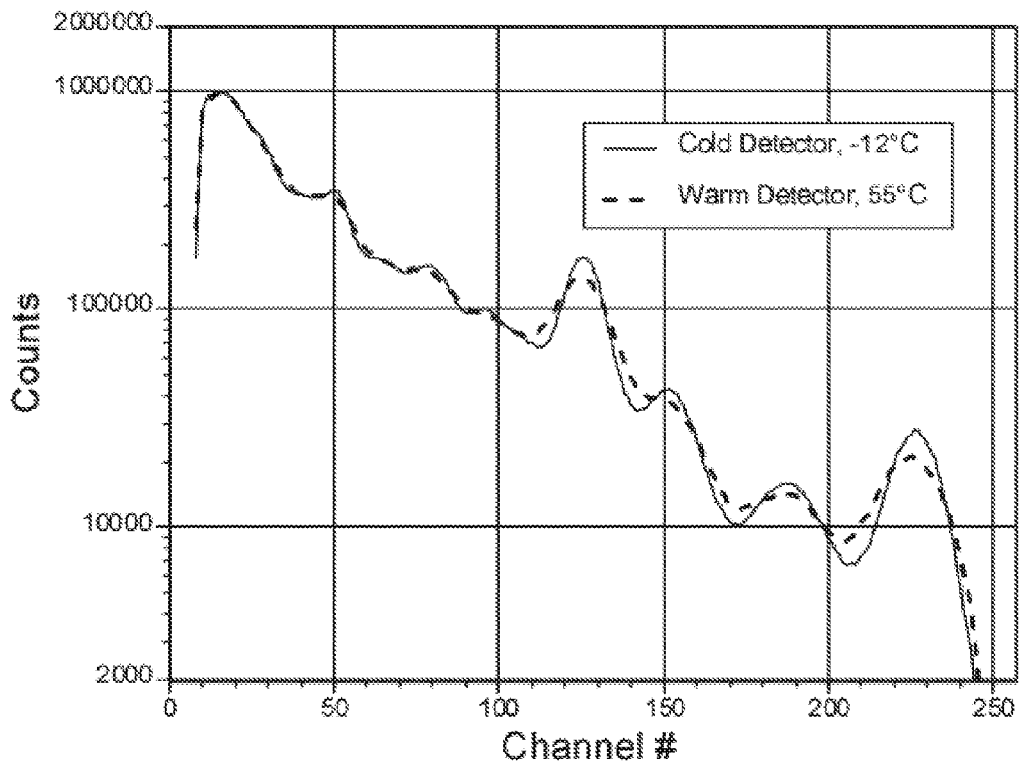
FIG. 3 shows a graph of an example of temperature induced changes in detector peak width (resolution) for a natural gamma ray spectrum acquired with a BGO (bismuth germanate) scintillator coupled to a photomultiplier (PMT).

The energy-to-channel calibration, i.e., the conversion of a channel number into an energy of a gamma ray detected by the radiation detector may be different between the standard spectra and the measured spectrum. Such differences may trigger adjusting the conversion coefficients between channel number and energy for the measured or the standard spectrum in order to obtain a match. In many cases, the conversion can be described by two or three parameters such as an offset (a shift of the channel of zero energy), a gain (a proportional adjustment of the energy scale) and a non-linearity term, i.e., a correction term to adjust for differences in the linearity of the channel number-to-energy conversion. In addition, standard spectra and measured spectra may have differences in the widths of the spectral peaks due to differences in detector performance and temperature effects. An example of temperature induced changes in detector peak width (resolution) is shown in FIG. 3 for a natural gamma ray spectrum acquired with a BGO (bismuth germanate) scintillator coupled to a photomultiplier (PMT).

If a spectrum contains signals only from gamma ray interactions or only from neutron interactions, then equation (1) can be re-written more generally as in equation (2):

$$U_i = \sum_{j=lower}^{upper} y_j \cdot S_{ij}(c_0, c_1, c_2, c_3) \quad (2)$$

where $c_0$ denotes a spectral offset, $c_1$ a gain, $c_2$ a non-linearity and $c_3$ a resolution adjustment coefficient. The coefficients $c_k$ (in eq. (2) the index k ranges from 0 to 3, but fewer or more coefficients are possible) represent fitting parameters to match the standard spectra to the measured spectra. Additional parameters may be used to account for more complex spectral differences between the standard spectra and the measured spectra. The fitting procedure may be, for example and without limitation, a non-linear least squares fitting procedure such as the Marquardt-Levenberg optimization. For purposes of the following description, it may assumed that the coefficients $c_k$ represent the amount of correction that needs to be applied to the standard spectra to match the measured spectrum, e.g., $c_{gain}$, $\gamma$=0.98 means that the standard spectrum has a higher gain than the measured spectrum and needs to be rescaled by a factor 0.98. It should be noted that the fitting procedure is not limited to least squares methods and that any other optimization method such as linear programming or maximum likelihood approaches may be used.

The measured spectrum U, in which it is desired to distinguish neutron induced and gamma ray induced spectral contributions in the present example embodiment results from irradiating a material with neutrons from a neutron source. Such a neutron source (e.g., 115 in FIG. 1D), as previously explained may be a radioisotope source such as a $^{241}$AmBe source, a $^{252}$Cf source, or a neutron generator relying on neutron reactions such as d-T, d-D or t-T for example. The neutron generator may be a pulsed neutron generator emitting bursts of fast (i.e., generally at least 1 MeV energy) neutrons in a selected timing sequence or it may be a generator that emits a substantially constant flux of neutrons. In some embodiments, the neutron source may be a nuclear reactor or a spallation source for example.

In the case of a pulsed neutron generator, it is well known that fast neutron induced gamma ray spectra and neutron flux can be measured during predetermined time intervals. Fast neutrons are only present during the neutron burst time interval and less than about 1 microsecond after the end of the neutron emission from the source. Therefore fast neutron induced gamma rays as well as a fast neutron flux are only observed during the time interval of the burst. The emitted neutrons are slowed down to epithermal and thermal energy within a few microseconds to several tens of microseconds. The capture of these epithermal and thermal neutrons by susceptible nuclei in the material surrounding or adjacent to the detector leads to characteristic capture gamma ray spectra. The capture of the neutrons in the scintillator by isotopes such as $^6$Li results in energetic charged particles leading to a spectral peak as indicated in FIG. 2. Fast neutron reactions may lead to additional spectral features which will only be present during the burst (generator "on") time interval. The neutron response spectra during and after the burst interval can be used to better separate the fast neutron response of the scintillator from its response to slow (epithermal and thermal) neutrons.

The description in eq. (2) above may be applied to either neutron induced spectral contributions or gamma ray induced spectral contributions. However, one or more of the fitting parameters $c_k$ may differ between the neutron induced and the gamma ray induced contributions to the measured spectrum. Generally, the fitting parameters $c_k$ vary slowly with time, while the spectral yields yj may vary quickly as a function of time as the well logging instrument moves through different composition subsurface formations (See FIGS. 1A and 1B). Changes in the fitting parameters $c_k$ are mainly affected by changes in temperature and to a lesser extent by the total count rate or the total energy weighted count rate from the radiation detector. Assuming signals from both neutrons and gamma rays are present in the measured spectrum, the measured spectrum may be described as in equation (3):

$$U_i = \sum_{j=lower,\gamma}^{upper,\gamma} y_{j,\gamma} \cdot S_{ij,\gamma}(c_{0,\gamma}, c_{1,\gamma}, c_{2,\gamma}, c_{3,\gamma}) + \sum_{l=lower,n}^{upper,n} y_{l,n} \cdot S_{il,n}(c_{0,n}, c_{1,n}, c_{2,n}, c_{3,n}) \quad (3)$$

where the neutron and the gamma ray contributions to the measured spectrum use separate, respective fitting parameters. In some instances, some fitting parameters may be the same for both the neutron and the gamma ray contributions or there may be a fixed relationship between the parameters, which can be exploited to reduce the statistical uncertainty of the decomposed measured spectra.

In some cases, there will only be a single spectral standard for the neutron response if the thermal and epithermal responses are dominating. If there is a significant contribution from fast neutron interactions, or if there is more than one heavy charged particle inducing neutron reaction in the scintillator, then more than one neutron standard spectrum is to perform the spectral decomposition. Neutron reactions producing gamma rays or electrons may be accounted for in the gamma ray response (tool background).

The respective gamma ray and neutron yields $y_{j,\gamma}$ and $y_{l,n}$ may be determined by, for example and without limitation, a non-linear fitting procedure or other optimization to provide the best match of between the right hand side and left hand side of eq. (3). A possible optimization procedure is described in U.S. Pat. No. 5,369,578 for the decomposition of a gamma ray spectrum. The foregoing procedure may be applied to a measured spectrum that contains contributions from neutron and gamma ray interactions with a radiation detector such as a scintillation detector. It should be noted that the effects described here with reference to scintillation detectors may also be found in solid state radiation detectors and thus the methods described herein may also be applied to solid state radiation detectors.

The neutron yields $y_{l,n}$ can be converted to a neutron count rate and by extension to a neutron flux by determining the total count rate in the spectral fitting range between lower and upper channel numbers of the pulse amplitude analyzer and determining the total area that is due to neutrons. The yields $y_{l,n}$ may be related to several different neutron interactions in the radiation detector. Such interactions may be thermal neutron capture such as the capture of a thermal (or epithermal) neutron by $^6$Li in the reaction $^6Li(n,\alpha) \rightarrow ^3H$ or due to a fast neutron interaction such as $^{35}Cl(n,p) \rightarrow ^{35}S$, each of which provides a different spectral response. It is therefore possible using the same radiation detector to obtain a measurement of a gamma ray spectrum, a slow neutron flux and a fast neutron flux.

If there is a need for an absolute determination of a gamma ray or neutron flux with respect to the number of neutrons emitted by the neutron source a neutron monitor detector may be used proximate the neutron source (115 in FIG. 1D) to measure the neutron flux from the neutron source. Such neutron monitor may not be needed if the neutron source is a radioisotope source but may be needed for neutron sources such as neutron generators, the output of which may vary with respect to time.

Given the statistical nature and possibly low count rates, measured spectra may be accumulated over a time of several minutes in order to allow an accurate determination of the fitting parameters $c_k$. The fitting parameters vary slowly, in particular with changes in temperature, but even at constant temperature a small drift may occur in the fitting parameters. However, the determination of the neutron or gamma ray yields may need to be performed more frequently in order to be able to observe changes with respect to time and, in the case of well logging, with depth (and thus the formation) as the logging instrument is moving in the wellbore.

It may also be possible to determine one or more of the fitting parameters during a calibration using calibration fixture at a convenient surface location. This may allow reducing the number of fitting parameters or, in some cases, obtaining better starting values for a fitting parameter determination procedure. Such starting values may be adjusted as a function of readily determinable parameters such as temperature. Such fitting parameters may in some embodiments be adjusted during well logging using a temperature-based lookup table rather than including them directly in the optimization procedure.

Figure 4:
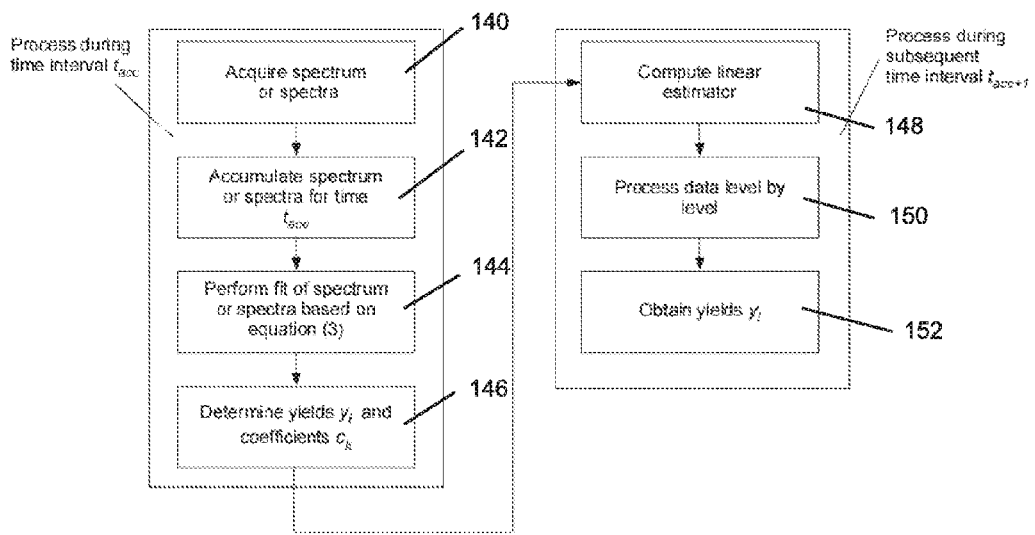
FIG. 4 shows a flow chart of one embodiment of a spectral decomposition method according to the present disclosure.
Figure 5:
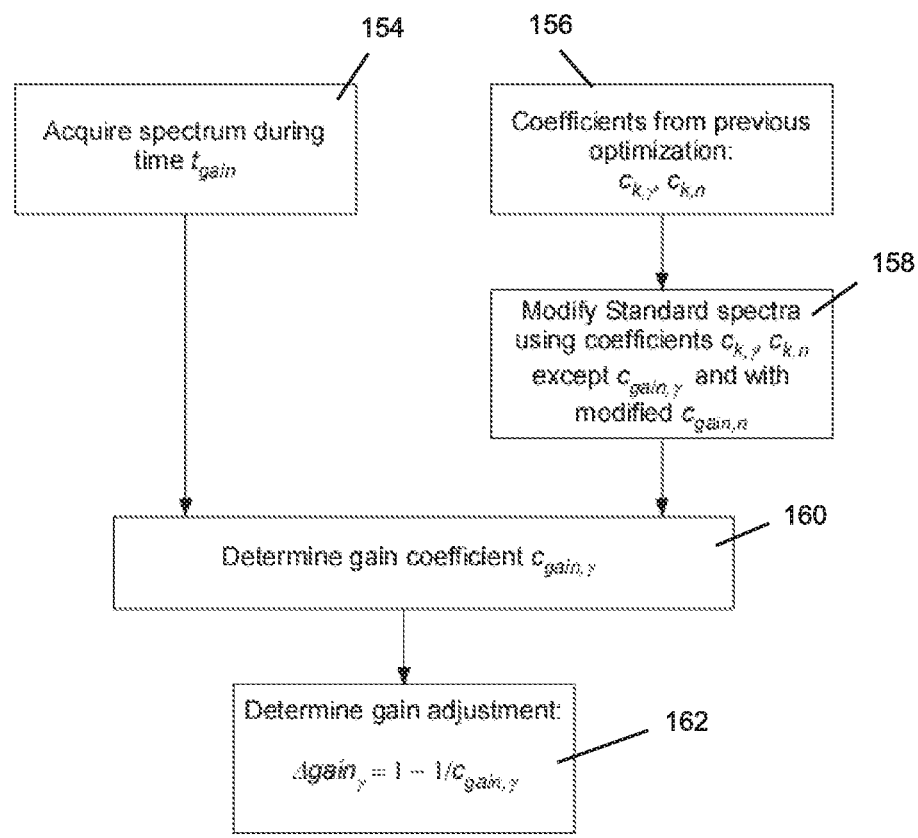
FIG. 5 shows a flow chart of one embodiment of a gain stabilization method according to the present disclosure.

FIG. 4 shows an example of a flow diagram of a "slow" determination of the fitting parameters $c_k$ and a fast determination of the spectral yields of gamma rays and neutrons using the parameters $c_k$ determined in the "slow" part. The parameters $c_k$ for a given interval may be determined in various ways depending on the application. The fast determination may involve only a linear problem as the yields may be determined, e.g., with a linear least squares fit, typically a weighted linear least squares fit as shown in equation (4) in matrix form:

$$[y] = \{[S]^T[W][S]\}^{-1}[S]^T[W][U] \qquad (4)$$

where $[y]$ is the vector of the spectral yields $y_j$ and $y_l$. W is the weight matrix representing the variance of each spectral channel i, $[S]$ is the matrix of the standard spectra $S_{ij}$ with the appropriate modifications using the coefficients (fitting parameters) $c_k$, $[S]^T$ represents the transpose of $[S]$ and $[U]$ the measured spectrum $U_i$.

In some applications a level by level determination of gain may be used in the fitting procedure in order to avoid biases due to fast changes in gain.

Examples of different methods are given below:

In a first approach outlined in FIG. 4, the fitting parameters are determined over a time span of several minutes covering a respective depth interval during well logging. The determined fitting parameters are then applied in a subsequent time interval for level by level or short time interval fitting procedure, assuming that changes from one time interval to the next are small. The long time interval may be a fixed interval, it may be based on requiring certain measurement statistics or it may be shortened or lengthened based on other parameters such as changes in temperature, a change in detector parameters (detector pulse shape or count rate). This approach is particularly valuable for real time display of yields to avoid a delay of tact until yields can be displayed. At 140, measurements of radiation events are analyzed with respect to amplitude of the detector output pulses and are allocated to channels related to the respective amplitudes. At 142, radiation events are detected over a longer time interval, $t_{acc}$. At 144, spectral fitting may be performed using, for example, eq. (3). Yields and fitting parameters are determined at 146. At 148, in a subsequent time interval $t_{acc+1}$ a linear estimator may be calculated from the fitting parameters determined at 146. Measured spectra may be processed on a depth or time measurement incremental basis at 150 using the linear estimator determined at 148. The processed spectra may be used, at 152, to determine elemental yields.

In a second approach, the fitting parameters $c_k$ are determined first over a given time interval and then used to determine gamma ray and neutron yields in shorter intervals inside the optimization time span. This reduces possible biases in a case, in which one or more of the fitting parameters should be varying substantially from one optimization interval to the next.

In a third approach, the parameters $c_k$ are determined over several time intervals, where these intervals may be overlapping, contiguous or non-contiguous and the fitting parameters $c_k$ are determined as a function of time through interpolation or a fitting procedure for each short time interval. This may be relevant in cases where there is a rapid change in one or more of the fitting parameters. The interpolation of fitting procedure may be applied to one or more of the fitting parameters.

In a fourth approach, the fitting parameters $c_k$ are interpolated between optimization intervals or extrapolated from a preceding or subsequent optimization interval by using a known dependence of such fitting parameter on external factors such as temperature or detector count rate.

In the first approach, there is a need to have initial values of the fitting parameters $c_k$ to be able to process the first optimization interval, because no optimized fitting parameters are available yet. The selection of the initial values of the fitting parameters can be based on a preceding calibration done, e.g., at a surface calibration facility prior to starting a measurement in a well. In addition, a priori known fitting parameters for external factors such as temperature and count rate may be applied to obtain a better first estimate. These predetermined fitting parameter values may also be used as the starting values for any chosen fitting procedure to accelerate the convergence of the fit and reduce the probability of the fit converging to a local minimum and not the global minimum in a goodness of fit value such as $\chi^2$.

In yet another approach, some of the fitting parameters such as non-linearity or offset may be adjusted at longer intervals than those for gain and spectral resolution.

As a result of the spectral decomposition, one will be able to determine separate neutron and gamma ray contributions and therefore obtain the measurement of a thermal or epithermal neutron flux, a fast neutron flux and gamma ray yields for different elements that contribute to the gamma ray spectrum. These yields may then be used for a detailed analysis of formation properties such as formation porosity and lithology, for example.

Gain Regulation

As indicated above, the gain of the pulse amplitude acquisition system may change with time or temperature, or due to other factors such as detector count rate. In order to avoid gain drifts, improve spectral resolution and improve the accuracy of the spectral decomposition, stabilization of the total gain of the detector system is performed.

The gain stabilization of a system according to the present disclosure may be based on methods described, for example, in U.S. Pat. Nos. 5,360,975, 7,081,616 and 8,173,953, the entire contents of which are hereby incorporated by reference into the current disclosure. However, in a detection system for neutrons and gamma rays, the energy calibration (gain) may not be the same for the neutron and the gamma ray part of the spectrum, as shown in FIG. 2. Typically, it will be advantageous to regulate the gain (channel to gamma ray energy correspondence) of the gamma ray spectrum in such a way that the calibration does not change over time or with temperature. As a practical matter, therefore, the gain of the neutron part of the spectrum will be changing with time.

The method disclosed in U.S. Pat. No. 5,360,975 fits a gain parameter $c_{gain}$ for the entire spectrum using a sum of standard spectra and determining a gain and spectral yields that provide the best fit. The deviation of the gain from 1 is used as a control signal to adjust the gain of the system. This adjustment may be performed, e.g., by adjusting the high voltage used to operate a photomultiplier coupled to a scintillator in the case of a photomultiplier based scintillation detector.

In the case of a combined neutron gamma radiation detector, the standard spectra are one or more gamma ray standard spectra and one or more neutron standard spectra, where the gamma ray standard spectra will vary differently in their spectral fitting parameters $c_k,\gamma$ than the neutron spectra with the fitting parameters $c_k,n$. When taking the sum of the spectra to obtain gamma ray spectral gain, the neutron standard spectrum or spectra have been modified with the proper gain and spectral resolution parameters. In most cases, parameters such as non-linearity and spectral offset may be the same for both neutrons and gamma rays and may not need to be fitted separately.

In order to determine the gamma ray gain, a least squares minimization (or other minimization or fitting procedure) may be applied to the description of the total spectrum shown in equation (5):

$$U_i = \sum_{j=lower,\gamma}^{upper,\gamma} y_{j,\gamma} \cdot S_{ij,\gamma}(c_{0,\gamma}, c_{1,\gamma}, c_{2,\gamma}, \ldots) + \sum_{l=lower,n}^{upper,n} y_{l,n} \cdot S_{il,n}(c_{0,n}, c_{1,n}, c_{2,n}, \ldots) \quad (5)$$

Fitting is only done for the yields y and the gain factor $c_1,\gamma$. It may be advantageous to fit also for the gain factor of the neutron part. Assuming that the relative gain between neutron and gamma ray spectra is a slowly varying function a relative gain $c_1,\gamma$ may be applied to the neutron standard spectra, which have been modified according to the parameters $c_k,n$. Similarly, the gamma ray standards have been modified using the coefficients $c_k,\gamma$ and the gain may then be determined based on the sum of these modified standards using a gain factor relative to the previously determined gain factor for example.

The minimization or fitting procedure may be a non-linear fitting procedure. It may also be a search for a minimum by varying the gain $c_1,\gamma$ over a certain search range to determine the best fit. An example embodiment of such a method is outlined in the flow diagram shown in FIG. 5.

The measured spectrum U is acquired during a selected time interval $t_{gain}$ at 154. Using the spectral optimization coefficients (fitting parameters) $c_k$ the standard spectra from the previous optimization at 156 are modified at 158 to obtain a best fit. However, the gain coefficient $c_{gain},\gamma$ is not used and is set to unity. The gain coefficient for the neutron spectrum $c_{gain},n$ is adjusted to take into account that the gamma ray gain coefficient has been set to 1.0 to ensure that the neutron and gamma ray relative spectral gain remains unchanged, as shown at 160 in FIG. 5. This is shown in equation (6):

$$c_{gain,n}^{mod} = c_{gain,n}/c_{gain,\gamma} \quad (6)$$

With the modified standards the difference between the nominal gain of 1 and the measured gain is established. The difference between the nominal gain (gain=1) and the measured gain, at 162 in FIG. 5, is used to determine the gain adjustment for the system as shown in equation (7).

$$\Delta gain = 1 - \frac{1}{c_{gain,\gamma}} \quad (7)$$

The adjustment time interval $t_{gain}$ may be a predetermined time interval, predetermined depth interval or maybe based on a measure of the statistical precision of the gain determination.

Application of methods according to the present disclosure are not limited to well logging or the oil and gas extraction industry in general. Methods according to the present disclosure may be used in any applications requiring spectral analysis and separation of neutron induced and gamma ray induced signals in a scintillation detector or other gamma ray detector. The method can complement or replace separation of neutron and gamma ray signals based on pulse shape discrimination.

In one example, one may use pulse shape discrimination to create separate spectra for neutrons and gamma rays based on the pulse shape and obtain fitting parameters in separate fits to the neutron and gamma ray spectra. As temperature increases, pulse shape discrimination may no longer be sufficient to separate neutron and gamma ray interactions in the detector and the method may make a sudden or gradual transition to fitting the total spectrum. In the gradual transition, this may be achieved by fitting the gamma ray contaminated neutron spectrum or the neutron contaminated gamma ray spectrum using neutron and gamma ray standard spectra in the same way as would be done in the absence of neutron-gamma discrimination. The advantage of this approach may be an improvement in the neutron and gamma ray fits since the neutron or gamma ray signal will be predominant in one or the other spectrum. Eventually, as the neutron-gamma discrimination stops working or if the gradual transition may not be used, a single spectral fit for neutrons and gamma rays may be used as described before.

The method may also be applied in more general situations in which a mixed neutron and gamma ray field exists and not all of the gamma rays are induced by neutrons. This may include the presence of several radioactive materials, some of which may emit neutrons during their decay.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. A method for separating and quantifying gamma ray induced and neutron induced responses detected by a radiation detector in a downhole tool moving in a wellbore traversing a subsurface formation, comprising: detecting radiation events in a radiation field comprising neutrons and gamma rays;
   in a processor, converting the detected radiation events into a detector pulse amplitude spectrum;
   in the processor, decomposing the detector pulse amplitude spectrum into data sets from detected gamma rays and detected neutrons using gamma ray standard spectra and neutron standard spectra and a spectral fitting procedure which results in a best fit between a weighted sum of the data sets and the detector pulse amplitude spectrum;
   wherein the fitting procedure comprises determining, in the processor, fitting parameters for each of the gamma ray standard spectra and neutron standard spectra, at least one of the fitting parameters being different for the gamma ray standard spectra and the neutron standard spectra; and
   in the processor, determining a property of the subsurface formation.

2. The method of claim 1, wherein the radiation field is produced by a neutron source irradiating material near the neutron source.

3. The method of claim 2, wherein the neutron source comprises a radioisotope source.

4. The method of claim 2, wherein the neutron source comprises an electrically operated neutron source.

5. The method of claim 4, wherein the neutron source comprises a pulsed neutron source.

6. The method of claim 2, wherein the fitted neutron contribution weights normalized by the neutron output of the neutron source are used to determine at least one of a thermal, an epithermal or a fast neutron flux at the detector location.

7. The method of claim 1, wherein the radiation detector comprises at least one isotope which emits heavy charged particles as a result of a neutron interaction with the at least one isotope.

8. The method of claim 7, wherein the neutron interaction is a neutron capture reaction.

9. The method of claim 8, wherein the isotope comprises at least one of $^6$Li or $^{10}$B.

10. The method of claim 7, wherein the neutron interaction is a fast neutron interaction.

11. The method of claim 10, wherein the reacting isotope is $^{35}$Cl.

12. The method of claim 1, wherein the fitting procedure comprises a non-linear weighted least squares procedure.

13. The method of claim 1 wherein detecting radiation events comprises detecting radiation from the subsurface formation while moving a well logging instrument along the wellbore.

14. The system of claim 13, wherein the well lodging instrument is moved by an armored electrical cable or a drill string.

15. A method for stabilizing the gain of a spectroscopy system for gamma rays and neutrons in a downhole tool comprising:
   detecting radiation events in a radiation field comprising neutrons and gamma rays;
   in a processor, converting the detected radiation events into a pulse amplitude spectrum;
   in the processor, decomposing the detector pulse amplitude spectrum into data sets from detected gamma rays and detected neutrons using gamma ray standard spectra and neutron standard spectra and a spectral fitting procedure which results in a best fit between a weighted sum of the data sets and the detector pulse amplitude spectrum;
   wherein the fitting procedure comprises determining, in the processor, fitting parameters for each of the gamma ray standard spectra and neutron standard spectra, at least one of the fitting parameters is a spectral gain; and
   in the processor, using the spectra gain fitting parameter to adjust a gain of a radiation detector spectroscopy system, determining a property of a subterranean formation from which the gamma rays and neutrons are detected.

16. The method of claim 15, wherein the spectral gain fitting parameter comprises a gamma ray spectral gain coefficient.

17. The method of claim 15, wherein the fitting parameters are determined over a first selected time interval.

18. The method of claim 17, wherein the gamma ray gain coefficient is determined during a second time interval shorter than the first time interval and wherein other fitting parameters are maintained constant during the second time interval.

19. The method of claim 15 wherein detecting radiation events comprises detecting radiation from subsurface formations while moving a well logging instrument along a wellbore.

20. A system for detecting neutrons and gamma rays using single detector in a downhole tool and distinguishing the neutron contribution from the gamma ray contribution in a pulse height spectrum comprising:
   a neutron and gamma ray detector wherein the neutrons are detected through a neutron reaction inducing heavy charged particles;
   a detector pulse amplitude analyzer in signal communication with the neutron and gamma ray detector;
   a processor in signal communication with the detector pulse amplitude analyzer configured decompose an output thereof into spectral data sets from gamma rays and neutrons using a fitting procedure establishing a best fit between a set of standard spectra and the output of the detector pulse amplitude analyzer; the processor configured to calculate at least one fitting coefficient for the fitting procedure wherein the at least one of the fitting coefficients applied to the decomposed output is different between the neutron and the gamma ray standard spectra; the processor further configured to determine elemental gamma ray data sets and neutron data sets from the decomposed output and the determined fitting coefficients, and the processor further configured to determine a property of a subsurface formation from which the neutrons and gamma rays are detected.

* * * * *